United States Patent
Moriya

(10) Patent No.: US 7,570,814 B2
(45) Date of Patent: Aug. 4, 2009

(54) DATA PROCESSING DEVICE, DATA PROCESSING METHOD, AND ELECTRONIC DEVICE

(75) Inventor: Takashiro Moriya, Tokyo (JP)

(73) Assignee: NEC Corporation, Tokyo (JP)

( * ) Notice: Subject to any disclaimer, the term of this patent is extended or adjusted under 35 U.S.C. 154(b) by 915 days.

(21) Appl. No.: 10/969,953

(22) Filed: Oct. 22, 2004

(65) Prior Publication Data

US 2005/0107127 A1 May 19, 2005

(30) Foreign Application Priority Data

Oct. 30, 2003 (JP) .............................. 2003-370831

(51) Int. Cl.
 *G06K 9/62* (2006.01)
(52) U.S. Cl. ...................... 382/209; 382/100; 382/218; 382/229
(58) Field of Classification Search ................ 455/509, 455/566; 709/206; 382/209, 229, 218, 214, 382/215, 100, 118, 159, 166, 183; 704/258, 704/265, 277; 434/316; 345/418; 358/539, 358/1.9; 235/462.15
See application file for complete search history.

(56) References Cited

U.S. PATENT DOCUMENTS

| | | | | |
|---|---|---|---|---|
| 4,985,863 A | * | 1/1991 | Fujisawa et al. | ................ 707/5 |
| 5,265,242 A | * | 11/1993 | Fujisawa et al. | ................ 707/3 |
| 5,628,003 A | * | 5/1997 | Fujisawa et al. | ......... 707/104.1 |
| 6,052,600 A | * | 4/2000 | Fette et al. | ................... 455/509 |
| 7,478,047 B2 | * | 1/2009 | Loyall et al. | ................ 704/258 |
| 2004/0024822 A1 | * | 2/2004 | Werndorfer et al. | ......... 709/206 |

FOREIGN PATENT DOCUMENTS

| | | |
|---|---|---|
| JP | 10-149433 | 6/1998 |
| JP | 11-305987 | 11/1999 |
| JP | 2001-273238 A | 10/2001 |
| JP | 2002-032306 A | 1/2002 |
| JP | 2002-342234 A | 11/2002 |
| WO | WO 00/21057 | 4/2000 |
| WO | WO 02/080107 A1 | 10/2002 |
| WO | WO 02/100121 A2 | 12/2002 |
| WO | WO 03/071520 A1 | 8/2003 |

OTHER PUBLICATIONS

Patent Abstracts of Japan, vol. 2000, No. 09, Oct. 13, 2003, abstract only.
Japan Office Action dated Apr. 1, 2009 from a related application, 2 pages.

* cited by examiner

*Primary Examiner*—Anh Hong Do
(74) *Attorney, Agent, or Firm*—Foley & Lardner LLP

(57) ABSTRACT

The cellular phone is provided with a storing unit including: a first storing unit for storing special character data, which includes at least one of pictogram data representing an expression and emotion character data representing an emotion in a form of a character; a second storing unit for storing expression image data, which richly represents expressions and/or emotions corresponding to the special character data in a form of an image; and a third storing unit for previously storing a correspondence relation between each piece of the special character data and each piece of the expression image data. Special character data contained in a received email is compared with special character data stored in the first storing unit. Matched special character data is compared with the expression image data stored in the second storing unit. Further matched special character data is read from the third storing unit. The expression image data is displayed on a display.

15 Claims, 11 Drawing Sheets

| EMOTION CHARACTER DATA | EXPRESSION IMAGE DATA |
|---|---|
| HAPPY | SMILING FACE |
| SAD | CRYING FACE |
| ..... | ANGRY FACE |
| . | . |
| . | . |
| . | . |

US 7,570,814 B2

DATA PROCESSING DEVICE, DATA PROCESSING METHOD, AND ELECTRONIC DEVICE

BACKGROUND OF THE INVENTION

1. Field of the Invention

The present invention relates to a data processing device, a data processing method, and an electronic device, in which character data is converted into image (graphic) data.

In particular, the present invention relates to a data processing device and a data processing method, which facilitate an understanding of an emotion expressed in a data content of, for example, an email, and an electronic device equipped with the data processing device, such as a cellular phone.

2. Description of the Related Art

Examples of an electronic device such as a cellular phone include a device having a function of sending/receiving an email. A body of the email is composed of ordinary character data including alphabet, kanji, hiragana, and katakana characters, and special character data including a pictogram that represents a facial expression. Some pictograms are formed by combining symbols including "(", ")", "-", and ";". Such ordinary character data and special character data are generally stored in a memory of the cellular phone.

Another example of the electronic device such as a cellular phone is a device having a voice synthesis function of outputting a voice by converting text data composing the body of the email into the voice. The electronic device with the voice synthesis function thus reads aloud the text data, so that the content of the email can be recognized in an audible manner.

Up to now, a mail transmitter/receiver has been proposed, in which image data representing an expression such as happiness, anger, sadness, or pleasure is displayed during transmission/reception of an email (in a standby mode) (see JP 2001-273238 A).

Another conventional technology has been proposed as a face mark inputting device in which image data representing an expression such as happiness, anger, sadness, or pleasure is combined with prepared text data (see JP 10-149433 A). The combination between the image data and the text data is performed according to the following steps. That is, text data that is previously inputted is first analyzed, and word/phrase data including "pleasant" is next extracted from the text data. After that, image data corresponding to the word/phrase data is created, and the created image data is finally inserted into the text data (see paragraphs "0020" and "0021" of JP 10-149433 A).

The body of an email is composed only of ordinary character data and special character data including a pictogram. Therefore, in order to understand the content of the email, for example, an emotion (happiness, anger, sadness, or pleasure) of the sender, the recipient of the email needs to read the body of the received email to a certain extent before grasping the content of the email. In an emergency, it may particularly be hard to convey the emotion of a sender promptly.

Alternatively, the electronic device having a voice synthesis function reads aloud the text data of an email, so that the text data can be recognized in an audible manner. However, it is necessary to listen to the reading voice (email content) before grasping the content of the received email to a certain extent. That is, even in the case of recognizing the content of an email in an audible manner, it may be difficult to promptly understand the emotion of the sender like the case where the recipient himself/herself reads the body of an email.

The configuration of the mail transmitter/receiver disclosed in JP 2001-273238 A is only for displaying image data representing an expression such as happiness, anger, sadness, or pleasure (see FIG. 6 of JP 2001-273238 A) in a standby mode during transmission/reception of an email (see FIG. 13 of JP 2001-273238 A). In addition, according to the mail transmitter/receiver disclosed in JP 2001-273238 A, the image data needs to be created by making a selection from among face parts that are registered in advance (see FIG. 4 of JP 2001-273238 A).

According to the face mark inputting device disclosed in JP 10-149433 A, similarly to the case of creating image data in JP 2001-273238 A, it is necessary to create image data corresponding to word/phrase data including "pleasant" contained in the text data. That is, the mail transmitter/receiver of JP 2001-273238 A and the face mark inputting device of JP 10-149433 A each have an object to create such image data. Therefore, the mail transmitter/receiver of JP 2001-273238 A and the face mark inputting device of JP 10-149433 A each require a memory that stores various pieces of data such as the face parts, and have an increased load of creating the image data placed on a central processing unit (CPU).

SUMMARY OF THE INVENTION

The present invention has an object to provide a data processing device, a data processing method, and an electronic device, which facilitate an understanding of an emotion expressed in a data content of, for example, an email with the help of vision.

According to the present invention, there is provided a data processing device, including:

a first storing unit for storing special character data, which includes at least one of pictogram data representing an expression and emotion character data representing an emotion in a form of a character;

a second storing unit for storing expression image data, which richly represents expressions and/or emotions corresponding to the special character data in a form of an image;

first comparison means for comparing the special character data stored in the first storing unit with the expression image data corresponding to the special character data; and processing means for, when first comparison means finds that the expression image data matches the special character data, outputting the expression image data stored in the second storing unit.

According to the present invention, there is provided a data processing method, including:

comparing a special character data, which includes at least one of pictogram data representing an expression and emotion character data representing an emotion in a form of a character, with expression image data, which richly represents expressions and/or emotions corresponding to the special character data in a form of an image; and when the expression image data matches the special character data, outputting the expression image data.

According to the present invention, there is provided an electronic device, including:

a radio circuit capable of receiving an email by radio;

character extracting means for extracting, from the email, special character data, which includes at least one of pictogram data representing an expression and emotion character data representing an emotion in a form of a character;

a first storing unit for storing the special character data;

a second storing unit for storing expression image data, which richly represents expressions and/or emotions corresponding to the special character data in a form of an image;

first comparison means for comparing the special character data stored in the first storing unit with the expression image data corresponding to the special character data; and processing means for, when first comparison means finds that the expression image data matches the special character data, outputting the expression image data stored in the second storing unit.

According to the present invention, the special character data, which includes at least one of the pictogram data representing an expression and the emotion character data representing an emotion in the form of characters, is compared with and the expression image data, which richly represents expressions and/or emotions corresponding to the special character data in the form of images.

For example, if the "read character data" read from the outside matches the special character data, the special character data is compared with the expression image data.

When the expression image data matches the special character data, the expression image data is outputted. For example, the expression image data is displayed on the display. Note that the emotion character data refers to character data such as "happy". The pictogram data is data whose concept includes emoticon data such as "(;o;)"(In the English bloc, it is corresponding to ":'-(") representing "crying face" and a heart mark.

According to the present invention, the special character data representing an emotion is converted into the expression image (graphic) data. Therefore, a user can visually recognizes and grasps an emotion expressed in the content of, for example, an email with ease without such a deep understanding of the data content.

Further, according to the present invention, if there exists expression image data corresponding to the special character data contained in an email, the expression image data can be displayed, for example, on the display. Accordingly, the emotion can reliably be conveyed from the sender to the recipient.

DETAILED DESCRIPTION OF THE PREFERRED EMBODIMENTS

First Embodiment

Hereinafter, referring to FIGS. 1 to 4, description will be made of a data processing device, a data processing method, and an electronic device, such as a cellular phone, according to the first embodiment of the present invention.

Figure 1:
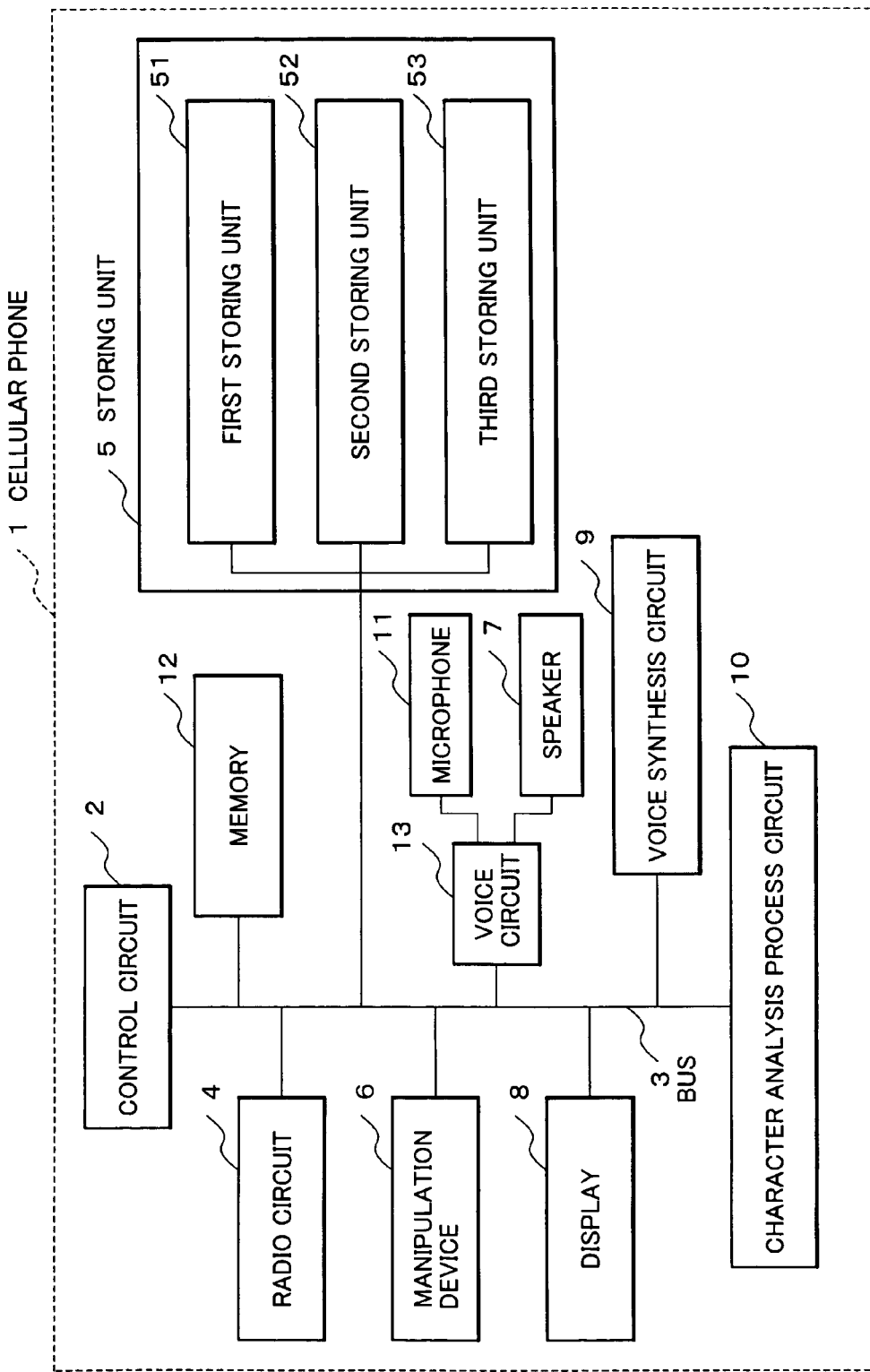
FIG. 1 is a block diagram of a cellular phone according to a first embodiment of the present invention.

As shown in FIG. 1, a cellular phone 1 includes: a storing unit 5 for storing various pieces of data relating to emotions of a person; a radio circuit 4 for transmitting/receiving of an email; a manipulation device 6 having various keys for inputting characters and the like; a display 8 for displaying various pieces of information; a voice synthesis circuit 9 for converting character data into a voice; a character analysis process circuit 10 serving as character extracting means for analyzing the character kinds of character data read from an email and the like and extracting a character string (or phrase/sentence (s)) such as "happy"; a memory (ROM, RAM, or the like) 12 having a recording area for reading/writing a program for execution of various processes, and various pieces of data (such as character data of an email body); a voice circuit 13 for converting a voice (signal) into a digital signal or an analog signal; and a control circuit (central process unit) 2. Those structural elements are interconnected via a bus 3.

Connected to the voice circuit 13 are a speaker 7 for outputting a voice and a microphone 11 for inputting a voice.

The control circuit 2 administers the overall operations of the cellular phone 1, and performs a process corresponding to manipulation effected through, for example, the manipulation device 6. The control circuit 2 includes one of a first comparison means, a second comparison means, processing means, and changing means. The cellular phone 1 is controlled by the control circuit 2 to perform communication with a base station constituting a part of mobile communication network (not shown) via the radio circuit 4. The radio circuit 4 amplifies and demodulates a receive signal that has been received through an antenna (not shown) to output the demodulated receive data to the control circuit 2. The radio circuit 4 also selects a signal frequency for a desired receive signal, and performs a frequency changing process.

The storing unit 5 includes a first storing unit 51 that previously stores special character data, a second storing unit 52 that previously stores expression image data, and a third storing unit 53 that previously stores a correspondence relation between each piece of the special character data and each piece of the expression image data.

The "special character data" previously stored in the first storing unit 51 refers to emotion character data that expresses emotions by means of characters. The "expression image data" previously stored in the second storing unit 52 refers to image data that richly represents expressions and/or emotions corresponding to the special character data in the form of images. The expression image data includes image data of an avatar (representing a user and used as the incarnation of the user on the Internet) that reflects the emotions expressed in the data content of an email and the like.

Figures 2, 3:
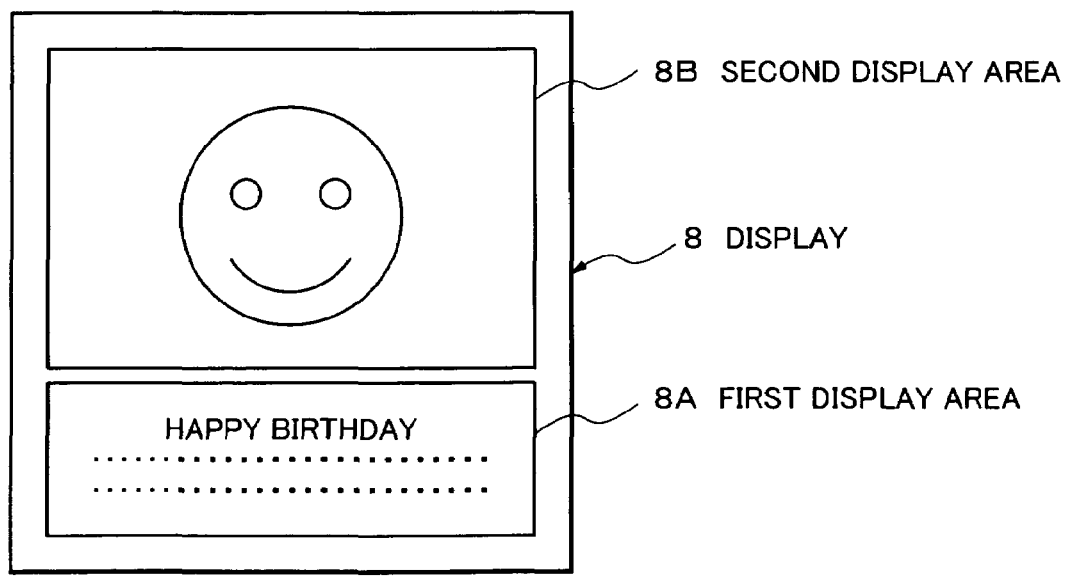
FIG. 2 is a diagram showing data stored in a third storing unit shown in FIG. 1.
FIG. 3 is a diagram showing an example of displaying corresponding pieces of data shown in FIG. 2 on a display.

As shown in FIG. 2, the third storing unit 53 stores a table defining the correspondence relations, in which each piece of the special character data stored in the first storing unit 51 is associated with a corresponding piece of the expression image data stored in the second storing unit 52. In such an example case as shown in FIG. 3, the emotion character data of "happy" corresponds to the expression image data of "smiling face".

Note that various pieces of data stored in the first storing unit 51, the second storing unit 52, and the third storing unit 53, which include pictogram data and expression image data, may be inputted from another electronic device through an interface, or may be registered through manipulation of the manipulation device 6.

The display 8 displays character data including a date, a time, a telephone number, and a content of an email body, and image information including a menu icon and a photograph. FIG. 3 is a diagram showing an example of displaying data on the display 8. As shown in FIG. 3, the display 8 is set to display data separately in a first display area 8A and a second display area 8B.

In the first display area 8A, read character data, which is read from the text data of a received email body, is displayed without modification. In the second display area 8B, the expression image data is displayed. In this embodiment, the second display area 8B is set to be larger than the first display area 8A.

In such an example case as shown in FIG. 3, the character data of "happy birthday" is displayed in the first display area 8A. The expression image data of "smiling face", which corresponds to the emotion character data of "happy" contained in the table of FIG. 2, is outputted to the second display area 8B.

The read character data, which is outputted to the display 8 as it is, is displayed in a size that suits the first display area 8A. Since the second display area 8B is larger than the first display area 8A, the expression image data outputted to the second display area 8B is displayed in a size larger than the read character data displayed in the first display area 8A.

Accordingly, the fact that the expression image data is displayed in a size larger than the read character data allows a user of the cellular phone 1, who has received an email, to visually recognizes and grasps the emotion expressed in the content of the email body with ease.

The character analysis process circuit 10 performs a character analysis process for determining whether the read character data is ordinary character data including alphabet, hiragana, katakana, and kanji characters, symbol data including punctuation symbols, or emotion character data. The character analysis process circuit 10 also has a function of reading out a character string (or phrase/sentence(s)) that expresses an emotion such as "happy" or "sad" from the character data of an email.

Figure 4:
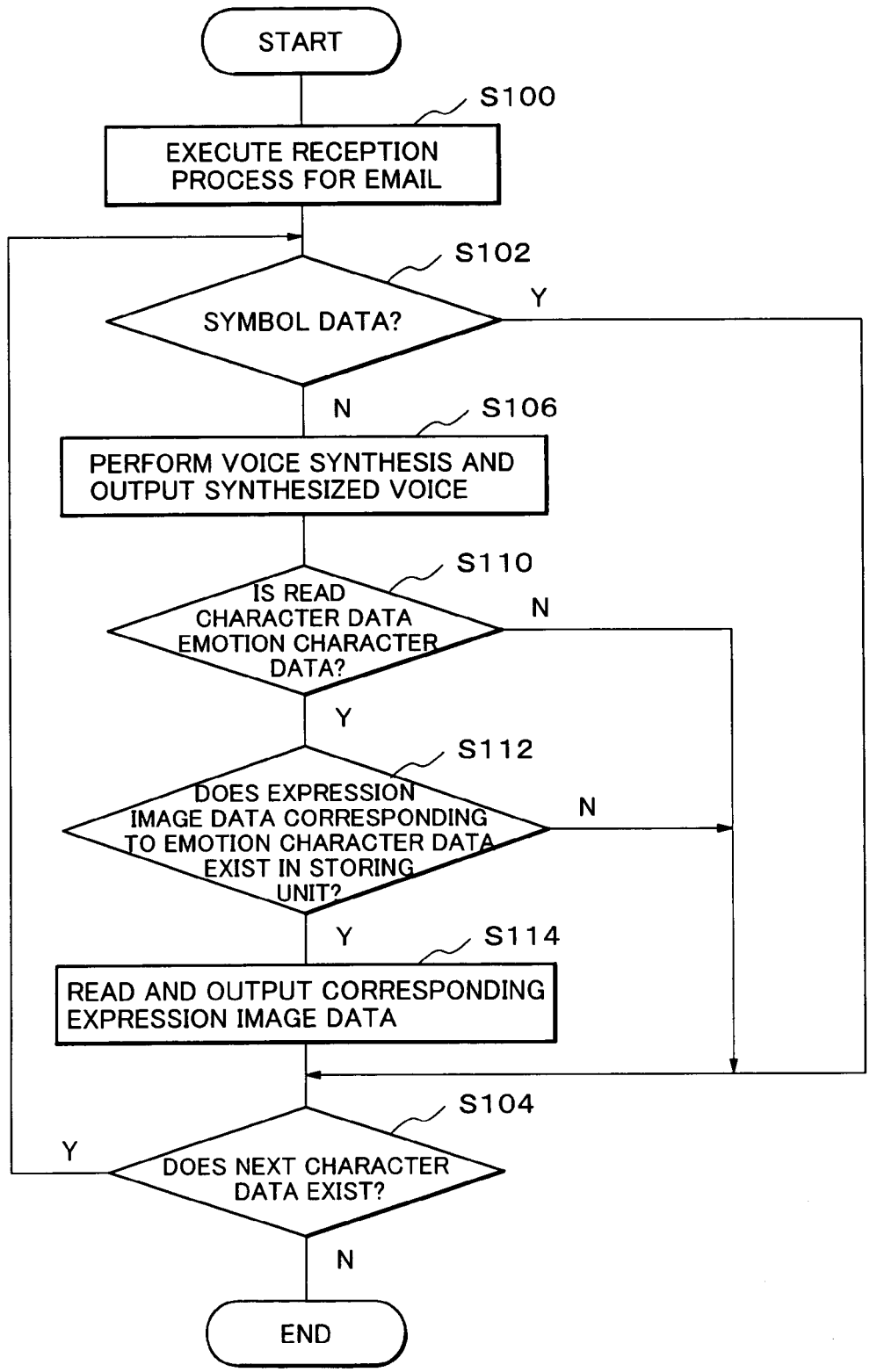
FIG. 4 is a flowchart showing a process flow of a data conversion program according to the first embodiment.

Next, referring to FIG. 4, description will be made of processing relating to the cellular phone 1. FIG. 4 is a flowchart showing a processing routine executed by the control circuit 2 of the cellular phone 1. A program containing the processing routine is previously stored in a program area of the memory 12.

The flowchart of FIG. 4 shows processing executed upon reception of an email after a user turns on a power switch (not shown) of the cellular phone 1.

As shown in FIG. 4, a reception process for an email is performed in step S100. In the reception process, email data is recorded in the memory 12 (see FIG. 1), while the email body of the email data is read by the character analysis process circuit 10. After the reception process, the character data of the email body is displayed in the first display area 8A (see FIG. 3) of the display 8.

In step S102, the read character data that has been read from the email body is analyzed from the leading character, and it is judged whether or not the read character data is symbol data such as a punctuation symbol. If step S102 results in YES ("Y"), that is, if the character data is symbol data, the procedure advances to step S104, where it is judged whether or not there exists the next character data. If step S104 results in YES, that is, if there exists the next character data, the procedure returns to step S102 to continue the character analysis process for the next character data. If step S104 results in NO ("N"), that is, if the next character data does not exist, the procedure of the flowchart comes to an end.

If step S102 results in NO, that is, if the character data is not symbol data, the procedure advances to step S106, where the character analysis process circuit 10 outputs character data including emotion character data and ordinary character data and excluding symbol data to the voice synthesis circuit 9, and the voice synthesis circuit 9 performs voice synthesis and outputs a synthesized voice. In other words, in step S106, the voice synthesis circuit 9 converts the character data into a voice and outputs an artificial voice corresponding to the character data from the speaker 7. Note that in step S106, the character data outputted from the character analysis process circuit 10 is converted into a voice and outputted on a character basis.

In step S110, it is judged whether or not the read character data that has been read from the email body is emotion character data stored in the first storing unit 51. In other words, in step S110, it is judged whether or not the character data is the emotion character data or the character data excluding the emotion character data and including kanji, hiragana, and katakana characters, alphabetical letters, Greek letters, numeric characters, and symbols (which is called ordinary character data). Note that a comparison process is performed by comparing the read character data with the "emotion character data" stored in the first storing unit 51.

If step S110 results in YES, that is, if the emotion character data is stored in the first storing unit 51, the procedure advances to step S112, where it is judged whether or not the expression image data corresponding to the emotion character data is stored in the third storing unit 53.

If step S112 results in YES, that is, if the expression image data corresponding to the emotion character data exists, the procedure advances to step S114, where the expression image data corresponding to the emotion character data is read from the second storing unit 52 and outputted to the second display area 8B (see FIG. 3). That is, as shown in FIG. 3, the expression image data corresponding to the emotion character data is displayed in the second display area 8B.

After the process of step S114 ends, the procedure advances to step S104, and the processes of steps S104 to S114 are repeated. If steps S110 or S112 results in NO, that is, if the emotion character data or the expression image data does not exist in the storing unit 5, the procedure advances to step S104. As described above, if step S104 results in NO, that is, if the next character data does not exist, the procedure of the flowchart comes to an end.

According to this embodiment, the expression image data corresponding to the emotion character data is displayed in the second display area 8B. Therefore, a user of the cellular phone 1, who has received an email, easily recognizes the expression image data (expression of an avatar).

To be more specific, according to this embodiment, by visually recognizing the expression of the avatar displayed in the second display area 8B, the emotion of the sender of an email (emotion expressed in the content of email data) is conveyed to the recipient of the email promptly and accurately.

Further, according to this embodiment, the expression image data corresponding to the emotion character data is displayed in the second display area 8B having a size larger than that of the first display area 8A of the display 8. Therefore, effects can be enhanced in terms of visual recognition.

Furthermore, according to this embodiment, the character data of an email is outputted by combining synthesized voice data obtained by converting the character data into a voice and the expression image data displayed in the first display area 8A. Therefore, it is possible to assume that the avatar (expression image data) reads the character data of the email aloud.

Second Embodiment

FIGS. 5 to 8 show a second embodiment of the present invention. In the second embodiment, the read character data of an email or the like is compared with the "special character data" including the emotion character data and the pictogram data.

Figure 5:
FIG. 5 is a diagram showing data stored in a third storing unit according to a second embodiment.

The "special character data" of this embodiment includes the pictogram data in addition to the emotion character data. As shown in FIG. 5, the pictogram data includes emoticon data such as "(;o;)" (In the English bloc, it is corresponding to ":'-(") formed integrally by combining a plurality of symbols and characters, and a broken heart mark depicted as a heart mark that is torn into two along a center line.

The emoticon data refers to data that is formed by combining symbols such as "(", ")", """, """", "?", "-", and ";", alphabetical letters such as "o" and "y", Greek letters such as "ϵ", and the like.

Therefore, the first storing unit 51 stores the pictogram data as shown in FIG. 5. The third storing unit 53 stores a table defining the correspondence relations, in which each piece of the pictogram data stored in the first storing unit 51 is associated with a corresponding piece of the expression image data stored in the second storing unit 52.

Figure 6:
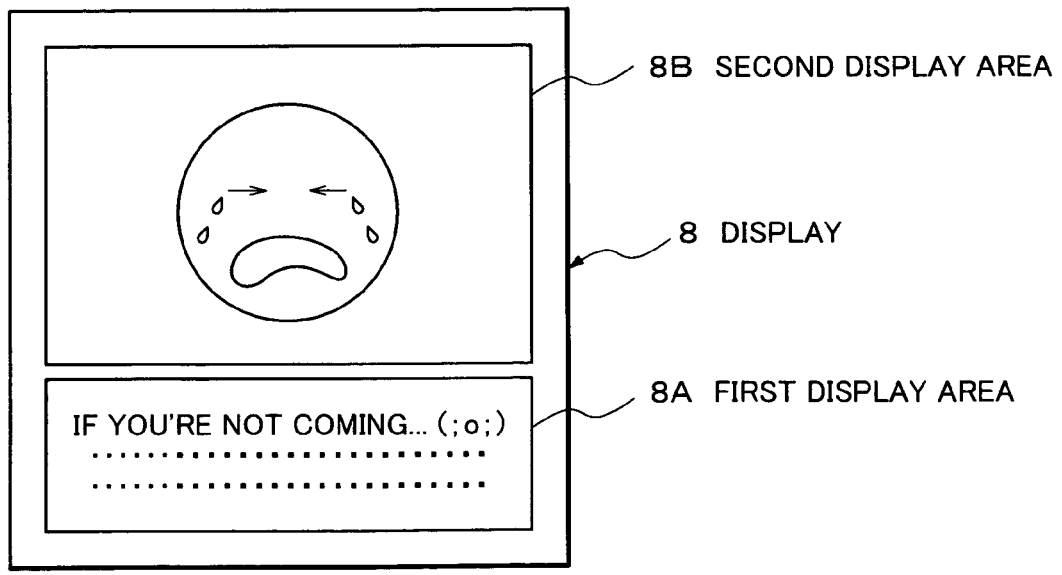
FIG. 6 is a diagram showing an example of displaying corresponding pieces of data shown in FIG. 5 on the display.
Figure 12:
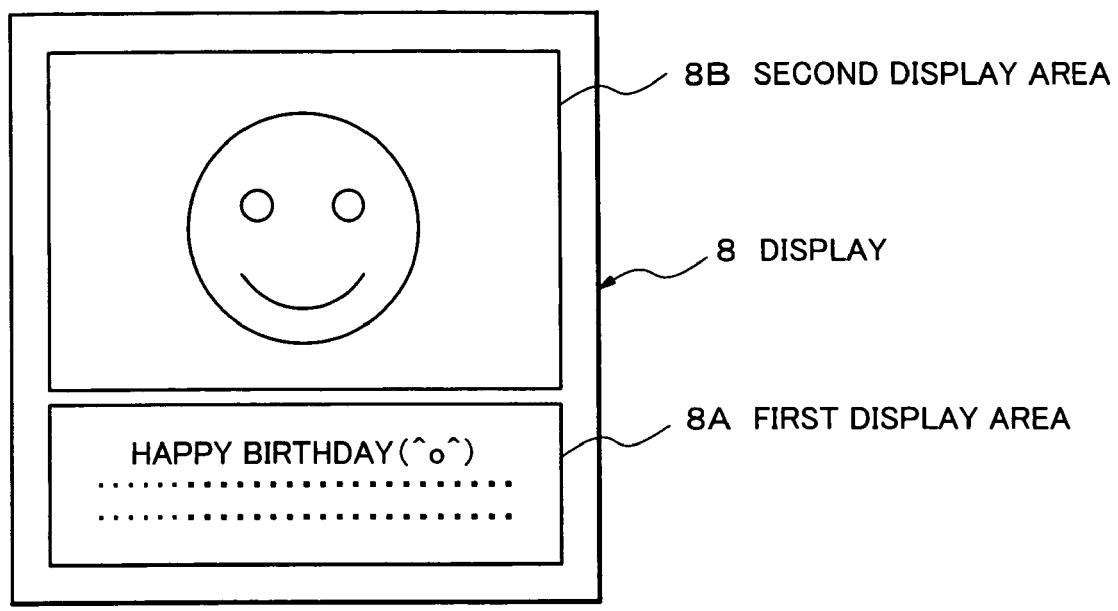
FIG. 12 is a diagram showing another display example of displaying corresponding pieces of data shown in FIG. 5 on the display.

For example, the pictogram data of "(;o;)" corresponds to the expression image data of "crying face" as shown in FIG. 6. For example, the pictogram data of "(ˆoˆ)"(In the English bloc, it is corresponding to ":-)") corresponds to the expression image data of "smiling face" as shown in FIG. 12.

Other structural elements are the same as those of the first embodiment shown in FIG. 1, and their detailed description will be omitted. The cellular phone 1 is also applied to this embodiment similarly to the first embodiment. Thus, the structural elements composing the cellular phone 1 are described by being denoted by the same reference numerals as those in FIG. 1. Note that in this embodiment, the "special character data" stored in the first storing unit 51 may only include the pictogram data.

Figure 7:
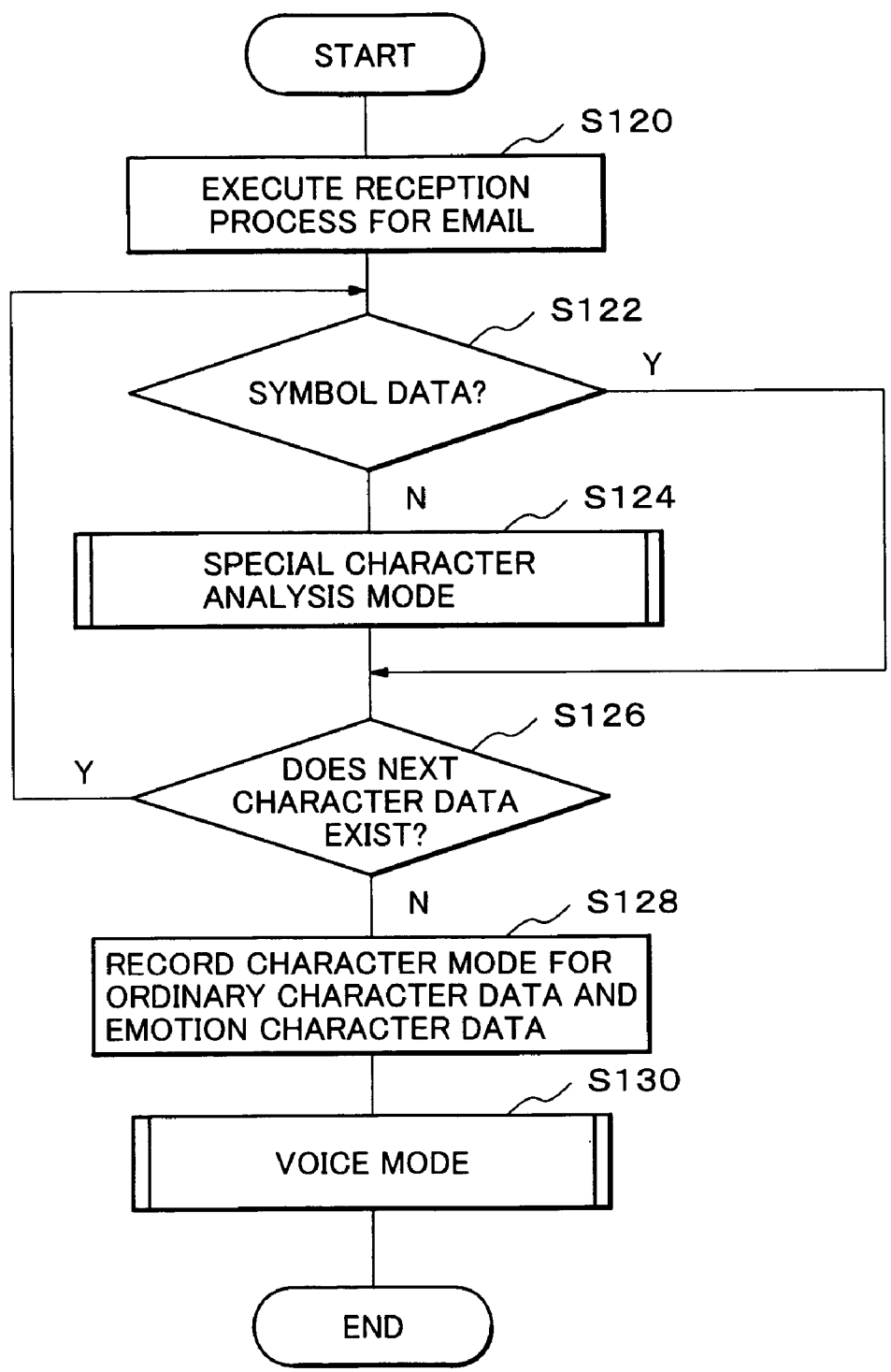
FIG. 7 is a flowchart showing a process flow of a data conversion program according to the second embodiment.

Next, referring to FIGS. 7 to 11, description will be made of processing relating to the cellular phone 1 according to the second embodiment. FIGS. 7 to 11 are flowcharts showing processing routines executed by the control circuit 2 of the cellular phone 1. In addition, the flowchart of FIG. 7 shows processing executed upon reception of an email after a user turns on a power switch (not shown) of the cellular phone 1.

As shown in FIG. 7, the reception process for an email is performed in step S120. In step S122, the character data within the email body is analyzed from the leading character, and it is judged whether or not the character data is symbol data such as a punctuation symbol. If step S122 results in NO, that is, if the character data is not symbol data, the procedure advances to step S124 for executing a special character analysis mode process.

If step S122 results in YES, the procedure advances to step S126, where it is judged whether or not the next character data exists. If step S126 results in YES, the procedure returns to step S122 to continue the character analysis process for the next character data. If step S126 results in NO, that is, if the next character data does not exist, the procedure advances to step S128, where the ordinary character data and the emotion character data are recorded in the memory 12 shown in FIG. 1. After the process of step S128, the procedure advances to step S130 for executing a voice mode process, thereby ending the procedure of the flowchart.

Next, referring to FIG. 8, description will be made of the special character analysis mode process of FIG. 7 (step S124). In the special character analysis mode process, based on priorities previously recorded in the memory 12 shown in FIG. 1, analysis processes are executed first on the pictogram data and then on the emotion character data.

Figure 8:
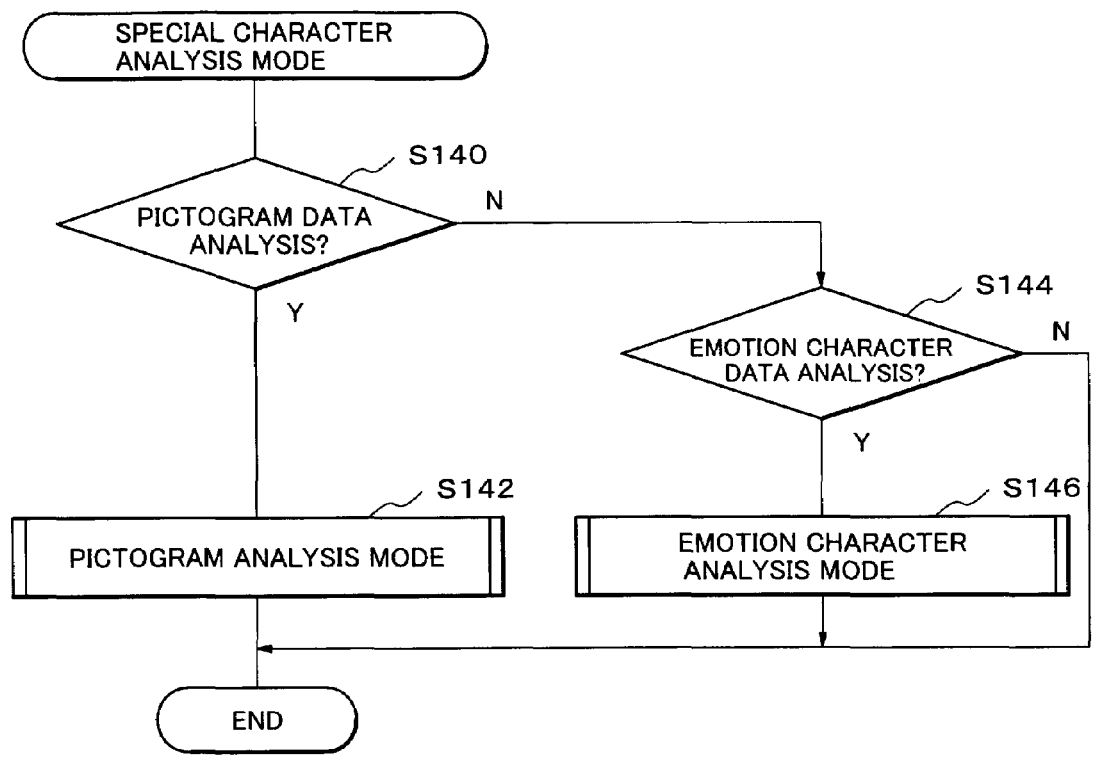
FIG. 8 is a subroutine showing a flow of a special character analysis mode process shown in FIG. 7.

To be more specific, as shown in FIG. 8, it is judged in step S140 whether or not the pictogram data is to be analyzed. If step S140 results in YES, that is, if the pictogram data is To be analyzed, the procedure advances to step S142 for executing a pictogram analysis mode process.

If step S140 results in NO, that is, if the pictogram data is not to be analyzed, the procedure advances to step S144, where it is judged whether or not the emotion character data is to be analyzed. If step S144 results in YES, that is, if the emotion character data is to be analyzed, the procedure advances to step S146 for executing an emotion character analysis mode process. If step S144 results in NO, that is, if the emotion character data is not to be analyzed, the character data in question is judged to be neither the pictogram data nor the emotion character data but the ordinary character data.

Figure 9:
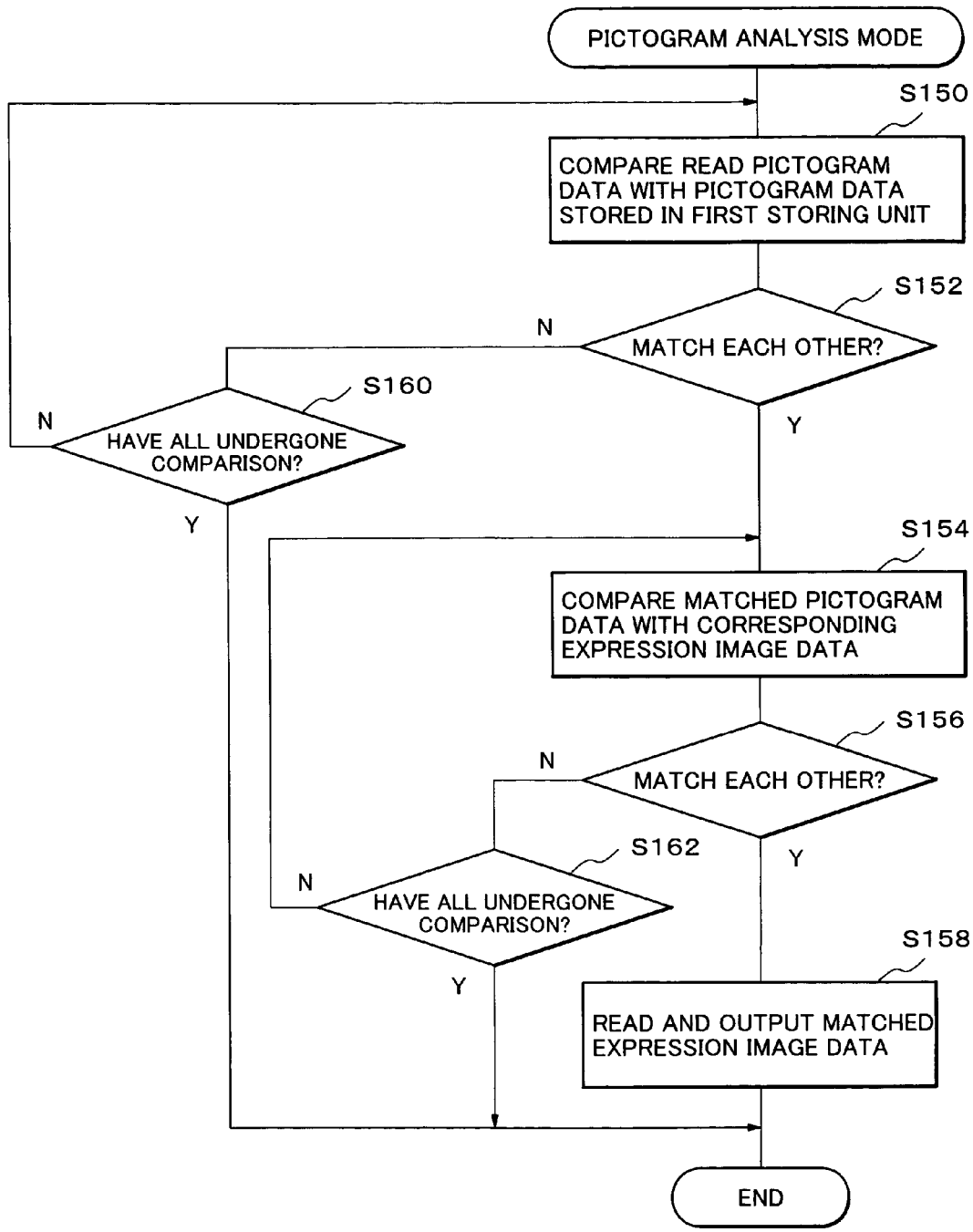
FIG. 9 is a subroutine showing a flow of a pictogram analysis mode process shown in FIG. 8;.

Next, referring to FIG. 9, description will be made of the pictogram analysis mode process of FIG. 8 (step S142). As shown in FIG. 9, in step S150, "pictogram data" read from the character data of an email body is compared with "pictogram data" stored in the first storing unit 51. In step S150, it is detected that a plurality of symbols, alphabetical letters, and/or Greek letters appear in a row, based on which it is judged that the read character data is pictogram data such as "(;o;)" or "(ˆoˆ)".

In step S152, it is judged whether or not the read "pictogram data" match the stored "pictogram data". In other words, in step S152, it is judged whether or not the read "pictogram data" is stored in the first storing unit 51.

If step S152 results in YES, that is, if the read "pictogram data" match the stored "pictogram data", the procedure advances to step S154, where the matched "pictogram data" is compared with the corresponding "expression image data". In other words, in step S154, it is judged whether or not the expression image data corresponding to the pictogram data is stored in the third storing unit 53. In step S156, it is judged whether or not the "pictogram data" match the "expression image data".

If step S156 results in YES, that is, the "pictogram data" match the "expression image data", the procedure advances to step S158, where the matched "expression image data" is read from the second storing unit 52, and outputted to the second display area 8B shown in FIG. 6. In other words, as shown in FIG. 6, the expression image data corresponding to the pictogram data of "(;o;)" is displayed in the second display area 8B.

If step S152 results in NO, that is, if the read "pictogram data" does not match the stored "pictogram data", the procedure advances to step S160, where it is judged whether or not all pieces of the "pictogram data" that are stored in the first storing unit 51 shown in FIG. 1 have undergone the comparison. If step S160 results in NO, that is, if all the pieces of the "pictogram data" that are stored in the first storing unit 51 have not undergone the comparison, the procedure returns to step S150 to continue the comparison process.

If step S160 results in YES, that is, all the pieces of the "pictogram data" that are stored in the first storing unit 51 have undergone the comparison, the subroutine comes to an end. In other words, step S160 is repeated until all the pieces of the "pictogram data" that are stored in the first storing unit 51 have undergone the comparison.

If step S156 results in NO, that is, the "pictogram data" does not match the "expression image data", the procedure advances to step S162, where it is judged whether or not all pieces of the "expression image data" that are stored in the third storing unit 53 shown in FIG. 1 have undergone the comparison. If step S162 results in NO, that is, if all the pieces of the "expression image data" that are stored in the third storing unit 53 have not undergone the comparison, the procedure returns to step S154 to continue the comparison process.

If step S162 results in YES, that is, all the pieces of the "expression image data" that are stored in the third storing unit 53 have undergone the comparison, the subroutine comes to an end. In other words, step S162 is repeated until all the pieces of the "expression image data" that are stored in the third storing unit 53 have undergone the comparison.

Figure 10:
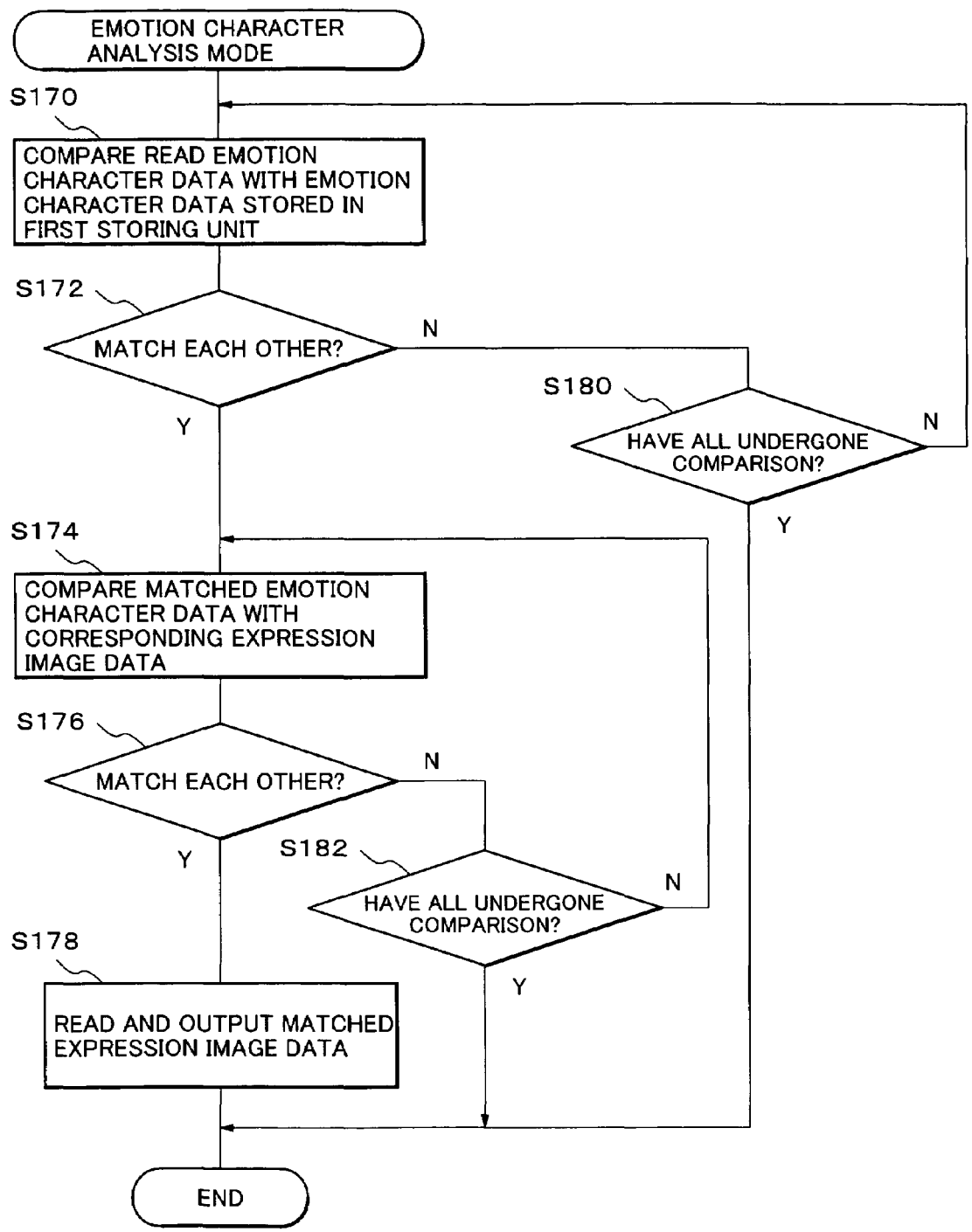
FIG. 10 is a subroutine showing a flow of an emotion character analysis mode process shown in FIG. 8.

Next, referring to FIG. 10, description will be made of the emotion character analysis mode process of FIG. 8 (step S146). As shown in FIG. 10, in step S170, "emotion character data" such as "sad" read from the character data of an email body is compared with "emotion character data" stored in the first storing unit 51.

In step 170, the read character data is compared with the "emotion character data" stored in the first storing unit 51.

In step S172, it is judged whether or not the read "emotion character data" match the stored "emotion character data". In other words, in step S172, it is judged whether or not the read "emotion character data" is stored in the first storing unit 51.

If step S172 results in YES, that is, if the read "emotion character data" match the stored "emotion character data", the procedure advances to step S174, where the matched "emotion character data" is compared with the corresponding "expression image data". In other words, in step S174, it is judged whether or not the expression image data corresponding to the emotion character data is stored in the third storing unit 53. In step S176, it is judged whether or not the "emotion character data" match the "expression image data".

If step S176 results in YES, that is, the "emotion character data" match the "expression image data", the procedure advances to step S178, where the matched "expression image data" is read from the second storing unit 52, and outputted to the second display area 8B shown in FIG. 6. In other words, as shown in FIG. 6, the expression image data corresponding to the emotion character data of "sad" is displayed in the second display area 8B.

If step S172 results in NO, that is, if the read "emotion character data" does not match the stored "emotion character data", the procedure advances to step S180, where it is judged whether or not all pieces of the "emotion character data" that are stored in the first storing unit 51 shown in FIG. 1 have undergone the comparison. If step S180 results in NO, that is, if all the pieces of the "emotion character data" that are stored in the first storing unit 51 have not undergone the comparison, the procedure returns to step S170 to continue the comparison process.

If step S180 results in YES, that is, all the pieces of the "emotion character data" that are stored in the first storing unit 51 have undergone the comparison, the subroutine comes to an end. In other words, step S180 is repeated until all the pieces of the "emotion character data" that are stored in the first storing unit 51 have undergone the comparison.

If step S176 results in NO, that is, the "emotion character data" does not match the "expression image data", the procedure advances to step S182, where it is judged whether or not all pieces of the "expression image data" that are stored in the third storing unit 53 shown in FIG. 1 have undergone the comparison. If step S182 results in NO, that is, if all the pieces of the "expression image data" that are stored in the third storing unit 53 have not undergone the comparison, the procedure returns to step S174 to continue the comparison process.

If step S182 results in YES, that is, all the pieces of the "expression image data" that are stored in the third storing unit 53 have undergone the comparison, the subroutine comes to an end. In other words, step S182 is repeated until all the pieces of the "expression image data" that are stored in the third storing unit 53 have undergone the comparison.

Figure 11:
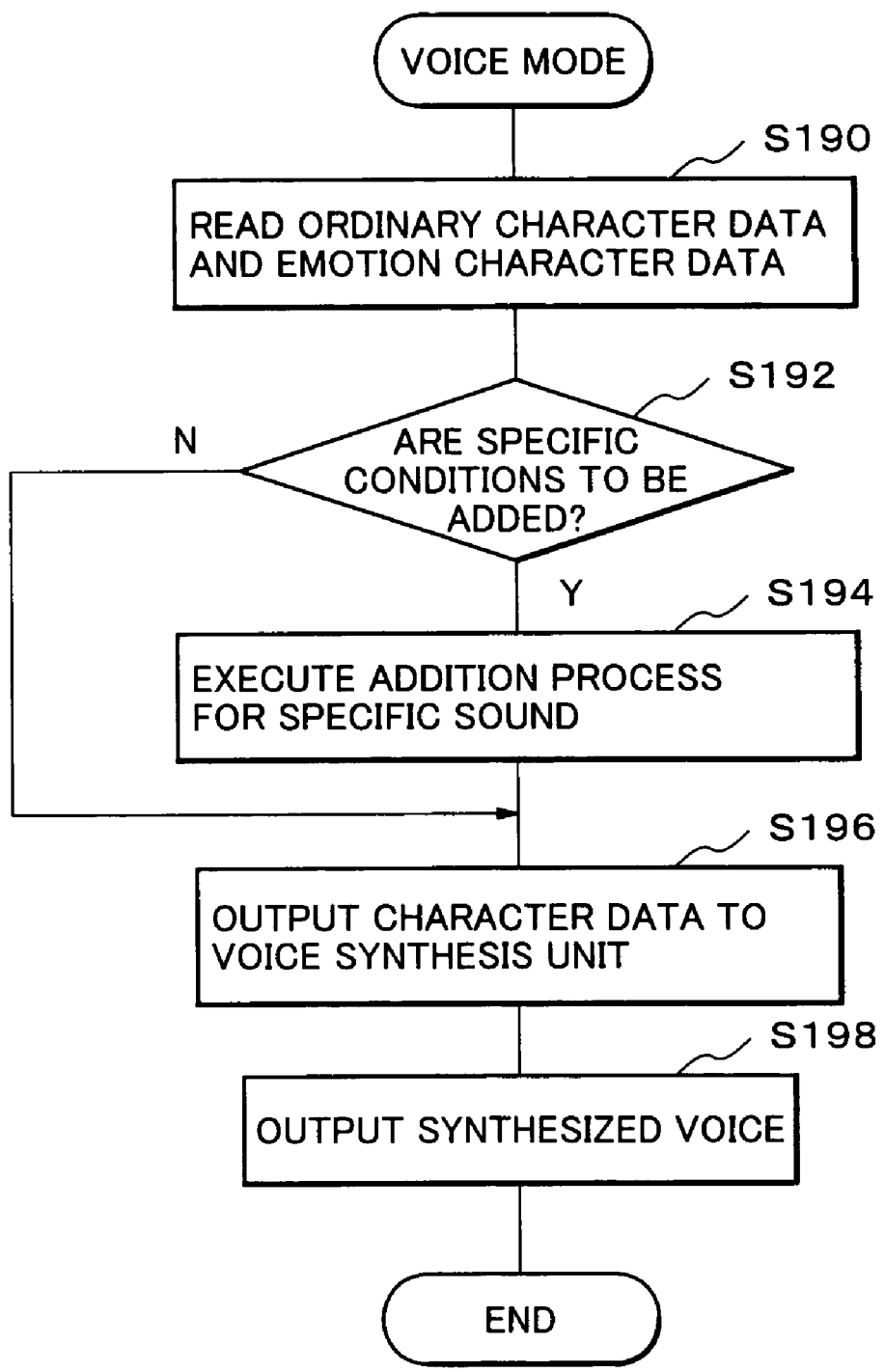
FIG. 11 is a subroutine showing a flow of a voice mode process shown in FIG. 7.

Finally, referring to FIG. 11, description will be made of the voice mode process of FIG. 7 (step S130). The subroutine of FIG. 11 is executed by manipulating the manipulation device 6 shown in FIG. 1 after the setting is made to the voice mode for converting the read character data into a voice. Also in this embodiment, specific conditions can be added by manipulating the manipulation device 6 shown in FIG. 1.

The term "specific conditions" used herein include a continuous voice mode for continuously converting the read character data into a continuous speech, an emotional voice mode for converting the read character data into a voice with the addition of an intonation corresponding to the emotion character data stored in the first storing unit 51, and a gender-specific mode for converting the read character data into a voice corresponding to the gender (male, female, or otherwise robot) of the sender of the email.

As shown in FIG. 11, in step S190, the ordinary character data and emotion character data that are recorded in the memory 12 (see step S128 shown in FIG. 7) are read out. In step S192, it is judged whether or not the specific conditions are to be added. If step S192 results in YES, that is, the specific conditions are to be added, the procedure advances to step S194, where the processes of adding, for example, the continuous voice mode, the emotional voice mode, and the gender-specific mode are performed.

After the process of step S194 ends, the procedure advances to step S196, where the ordinary character data and emotion character data to which the specific conditions are added are outputted to the voice synthesis circuit 9 shown in FIG. 1. In step S198, the voice synthesis circuit 9 performs voice synthesis and outputs a synthesized voice. In other words, in step S198, the voice synthesis circuit 9 converts the character data into a voice and outputs an artificial voice corresponding to the character data from the speaker 7.

If step S192 results in NO, that is, the specific conditions are not to be added, the procedure advances to the processes of step S196 and the subsequent steps. When the specific conditions are not added, similarly to the case of the first embodiment, the ordinary character data and the emotion character data are each converted into a voice and outputted on a character basis.

In the gender-specific mode, the control circuit 2 judges the gender of the sender of an email based on information including a name recorded in additional data of the email. A user may manipulate the manipulation device 6 shown in FIG. 1 to arbitrarily perform the setting of a reproduced sound in the gender-specific mode. In the continuous voice mode, voice conversion is performed when the read character data corresponds to a continuous character string such as "happy" which is previously recorded in the storing unit 5 of FIG. 1.

In this embodiment, the pictogram data as well as the emotion character data is compared with the expression image data. Therefore, an emotion expressed in the data content of an email is conveyed to the recipient of the email promptly and accurately. Other operations and effects are the same as those of the first embodiment, and their detailed description will be omitted.

Further, when the read character data is "happy birthday (^o^) . . . " as shown in the first display area 8A of FIG. 12, the judgment process is performed based on the analysis of the pictogram data having a higher priority. To be more specific, in this example, the judgment process is performed only on the pictogram data, so that the expression image data can be determined, and the expression image data corresponding to the pictogram data can be displayed in the second display area 8B.

Further, when an email contains plural pieces of special character data, plural pieces of expression image data corresponding to the pieces of special character data may collectively be displayed in the second display area 8B, or may be displayed such that each piece of expression image data appears in turn. Moreover, the expression image data may be image data representing not only a facial part but also the upper part of a person's body.

Further, in this embodiment, the read character data may represent not only the body data of the received email but also the body data of an email that is being prepared with the cellular phone 1. Moreover, when plural pieces of expression image data correspond to pieces of the emotion character data expressing the same emotion, selection may arbitrarily be made from the plural pieces of expression image data.

Figure 13:
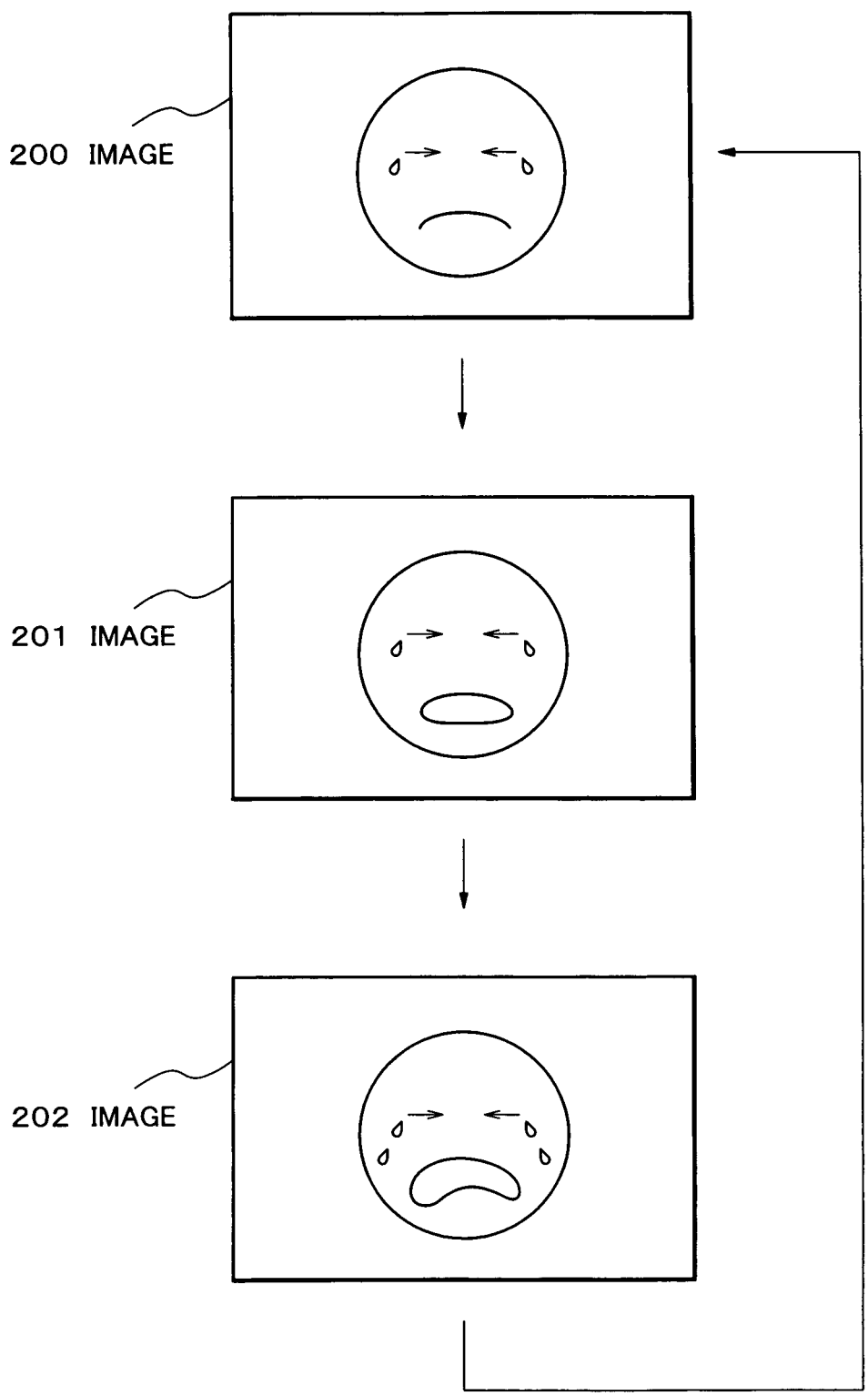
FIG. 13 is a diagram showing a modification of the display example shown in FIG. 12.

Further, in this embodiment, the control circuit 2 serving as the changing means may use plural pieces of expression image data constituting a series of actions to change the part, such as a mouth, of the expression image data in synchronization with the outputted voices in order to express the corresponding emotion. For example, as shown in FIG. 13, the expression image data displayed in the second display area 8B may be set to an animation mode, in which images 200, 201, and 202 are repeatedly displayed in the stated order (according to arrows of FIG. 13).

In this animation mode, the changing pieces of expression image data are used to produce more enhanced effects in terms of visual recognition than the first embodiment. To be more specific, the part, such as a mouth, of the expression image data moves, thereby realizing a so-called "reading avatar" that corresponds to an outputted voice.

Note that as a combination pattern applicable to the present invention, there may be a pattern of combining two or more examples selected from among the above-mentioned embodiments and modifications.

As shown in FIG. 1, the data processing device according to this embodiment includes the control circuit 2 serving as the first comparison means, the second comparison means, the processing means, or the changing means, the first storing unit 51, the second storing unit 52, the display 8 having the first display area 8A and the second display area 8B (see FIG. 3), the character analysis process circuit 10 as the serving as character extracting means, and the voice synthesis circuit 9 serving as voice synthesis means.

In this embodiment, the data processing device is incorporated in the cellular phone 1. According to the present invention, the data processing device including, for example, at least the control circuit 2 serving as the first comparison means or the processing means, the first storing unit 51, and the second storing unit 52, may be incorporated in an electronic device such as a personal computer and a personal digital assistants (PDAs). In other words, the concept of the electronic device according to the present invention includes the cellular phone, the personal computer, and the PDAs.

What is claimed is:

1. A data processing device, comprising:
a first storing unit for storing special character data, which includes at least one of pictogram data representing an expression and emotion character data representing an emotion in a form of a character;
a second storing unit for storing expression image data, which richly represents expressions or emotions corresponding to the special character data in a form of an image;
first comparison means for comparing the special character data stored in the first storing unit with the expression image data corresponding to the special character data;
second comparison means for comparing read character data with the special character data stored in the first storing unit;
voice synthesis means for converting read character data read by second comparison means into a voice on a character basis;
changing means for changing plural pieces of expression image data constituting a series of actions in synchronization with the voice outputted by voice synthesis means to express the corresponding emotion; and
processing means for, when first comparison means finds that the expression image data matches the special character data, outputting the expression image data stored in the second storing unit.

2. The data processing device according to claim 1, wherein only when second comparison means finds that the read character data matches the special character data, a comparison process is performed by first comparison means.

3. The data processing device according to claim 1, wherein when second comparison means compares the read character data with the special character data, the pictogram data is used for comparison prior to the emotion character data.

4. The data processing device according to claim 1, further comprising:
a display for displaying the read character data and the expression image data,
wherein the display comprises:
a first display area for displaying the read character data read by second comparison means; and
a second display area for displaying the expression image data outputted by processing means.

5. The data processing device according to claim 1, wherein voice synthesis means continuously converts the read character data into a continuous speech.

6. The data processing device according to claim 5, wherein voice synthesis means converts the read character data into a voice with addition of an intonation corresponding to the special character data stored in the first storing unit.

7. A data processing method, comprising:
comparing a special character data stored in a first storing unit, which includes at least one of pictogram data representing an expression and emotion character data representing an emotion in a form of a character, with expression image data stored in a second storing unit, which richly represents expressions or emotions corresponding to the special character data in a form of an image;

comparing read character data with the special character data stored in the first storing unit;

converting the read character data into a voice on a character basis with a voice synthesis means;

using changing means for changing plural pieces of expression image data constituting a series of actions in synchronization with the voice outputted by voice synthesis means to express the corresponding emotion; and when the expression image data matches the special character data, outputting the expression image data stored in the second storing unit.

8. The data processing method according to claim 7, wherein only when the read character data matches the special character data, the expression image data is used for the comparing of read character data.

9. The data processing method according to claim 7, wherein when the read character data is compared with the special character data, the pictogram data is used for the comparing of read character data prior to the emotion character data.

10. The data processing method according to claim 8, further comprising:

displaying the read character data and the expression image data on a display including a first display area and a second display area, wherein:

the read character data is displayed in the first display area; and the expression image data is displayed in the second display area.

11. An electronic device, comprising:

a radio circuit capable of receiving an email by radio;

character extracting means for extracting, from the email, special character data, which includes at least one of pictogram data representing an expression and emotion character data representing an emotion in a form of a character;

a first storing unit for storing the special character data;

a second storing unit for storing expression image data, which richly represents expressions or emotions corresponding to the special character data in a form of an image;

first comparison means for comparing the special character data stored in the first storing unit with the expression image data corresponding to the special character data;

second comparison means for comparing read character data with the special character data stored in the first storing unit;

voice synthesis means for converting read character data read by second comparison means into a voice on a character basis;

changing means for changing plural pieces of expression image data constituting a series of actions in synchronization with the voice outputted by voice synthesis means to express the corresponding emotion; and processing means for, when first comparison means finds that the expression image data matches the special character data, outputting the expression image data stored in the second storing unit.

12. The electronic device according to claim 11, wherein only when second comparison means finds that the read character data matches the special character data, a comparison process is performed by first comparison means.

13. The electronic device according to claim 11, wherein when second comparison means compares the read character data with the special character data, the pictogram data is used for comparison prior to the emotion character data.

14. The electronic device according to claim 11, further comprising:

a display for displaying the read character data and the expression image data, wherein the display comprises:

a first display area for displaying the read character data read by second comparison means; and a second display area for displaying the expression image data outputted by processing means.

15. The electronic device according to claim 14, wherein the second display area is set to be larger than the first display area.

* * * * *